Figure 1:
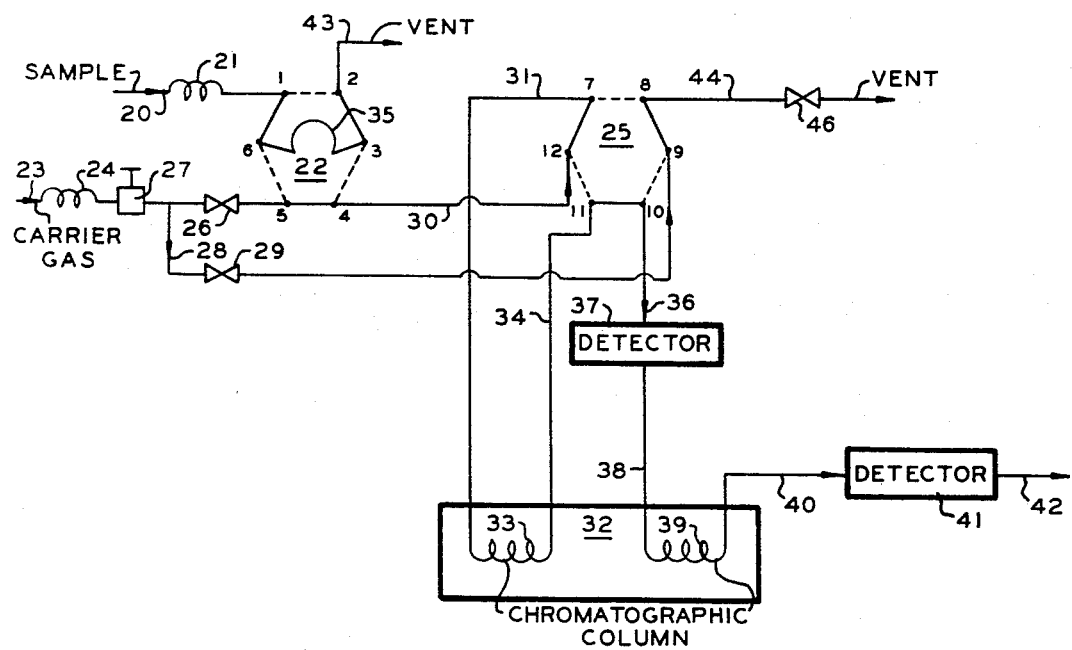

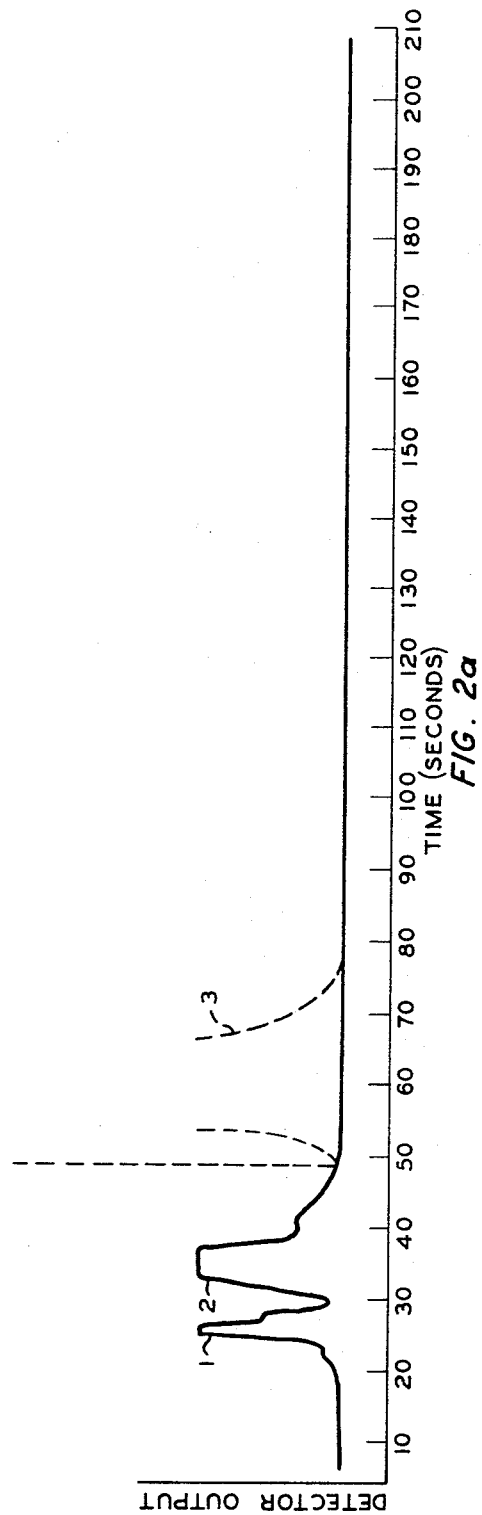
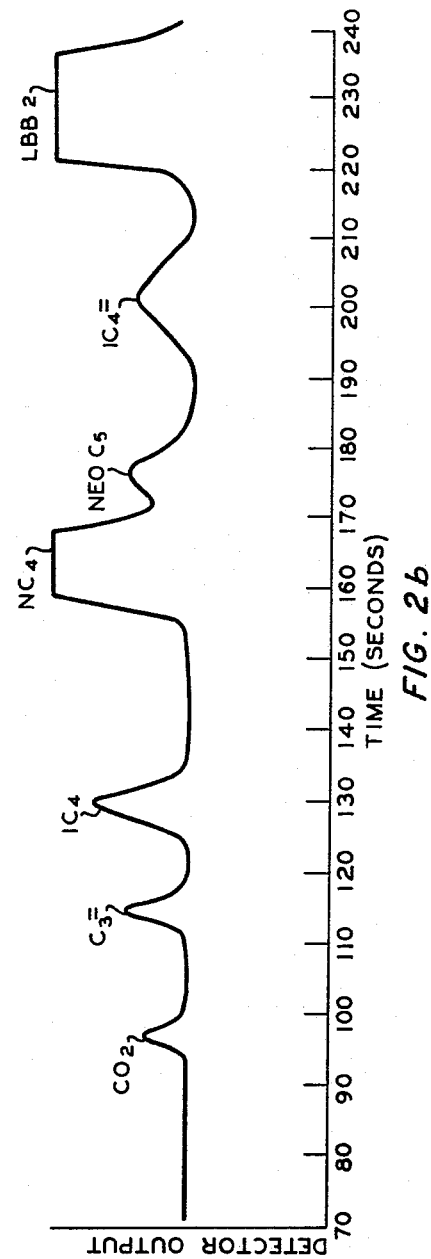

United States Patent Office 3,330,150
Patented July 11, 1967

**3,330,150
CHROMATOGRAPHIC ANALYSIS PROCESS**
Robert J. Loyd and James C. Henze, Bartlesville, Okla., assignors to Phillips Petroleum Company, a corporation of Delaware
Filed Nov. 20, 1963, Ser. No. 325,031
1 Claim. (Cl. 73—23.1)

This invention relates to an improved method of analysis. In another aspect, this invention relates to an improved chromatographic method of analysis wherein the chromatographic system pressure is maintained substantially constant during a column backflushing step. In yet another aspect, this invention realtes to an improved dual chromatographic column method of analyzing for isobutylene in the presence of butene-1.

A method of measuring the concentration of constituents of a fluid stream involves the use of a chromatographic analyzer. In chromatography, vaporous sample material to be analyzed is introduced into a column containing a selective sorbent or partitioning material. A carrier gas is directed into the column so as to force the sample material therethrough. The selective sorbent, or partitioning material, attempts to hold the constituents of the mixture. This results in the several constituents of the fluid mixture flowing through the column at different rates of speed, depending upon their affinities for the packing material. The column effluent thus consists initially of the carrier gas alone, the individual constituents of the fluid mixture appearing later at spaced time intervals. A conventional method of detecting the presence and concentration of these constituents is to employ a thermal conductivity detector which compares the thermal conductivity of the effluent gas with the thermal conductivity of the carrier gas directed to the column.

The resulting chromatographic peaks produced by the detector are recorded on a chart with each peak representative of a sample constituent. It is desirable that a chromatographic analysis system be operated at a substantially constant pressure as sudden changes in system pressure are also recorded as peaks on the recording chart, thereby making the analysis of sample fluids more difficult. When the chromatographic analysis procedure includes a column backflushing step, normally the chromatographic system pressure changes suddenly at the beginning of the backflushing step and again at the end of the backflushing step resulting in the recording on the chromatographic chart of false peaks.

In addition thereto, it is desirable to be able to readily and accurately determine the concentration of isobutylene in hydrocarbon process streams wherein said hydrocarbon process streams also contain butene-1. When such process streams are analyzed by conventional chromatographic methods of analysis, extremely long chromatographic analysis columns and/or long sample periods are normally required.

Accordingly, an object of our invention is to provide an improved chromatographic method of analysis and apparatus therefor.

Another object of our inevntion is to provide an improved chromatographic method of analysis wherein said method of analysis includes a back-flushing process step.

Another object of our invention is to provide an improved chromatographic method of analysis for isobutylene in the presence of butene-1.

Other objects, advantages and features of our invention will be readily apparent to those skilled in the art from the following description, the drawings and the appended claim.

Broadly, we have by our invention provided an improved chromatographic method of analysis wherein undesirable changes in the system pressure normally occurring during a column backflushing step are eliminated or reduced to a minimum. We have also provided an improved dual column chromatographic method of analyzing for isobutylene in the presence of butylene-1 wherein the said dual columns employ different packing materials and are maintained at a refrigerated temperature.

In the drawings:
FIGURE 1 illustrates schematically one embodiment of the inventive chromatographic method of analysis.
FIGURES 2a and 2b illustrate the effectiveness of the inventive chromatographic method of analysis.

The invention will hereinafter be described as applied to a specific analysis for isobutylene in the presence of butene-1 although it is not intended that the invention should be limited thereto.

Referring to FIGURE 1, a hydrocarbon sample comprising propane, propylene, isobutane, normal butane, neo-pentane, isobutylene, low and high boiling butene-2, and butene-1 is passed via conduit means 20 through a heat exchange means 21 wherein the sample mixture is heated to a temperature of 122° F. to a valve means 22. Valve means 22 is completely described in application Ser. No. 232,933 filed Oct. 25, 1962, by A. B. Broerman, now Patent 3,140,615, and comprises a valve mechanism wherein the direction of flow of two separate fluid streams through the valve mechanism can be changed responsive to a switching mechanism not herein illustrated. As illustrated, valve 22 contains a sample loop 35 and when positioned as shown, a sample flowing to valve 22 will flow from 1 to 6 through same loop 35 to 3, from 3 to 2, and from 2 to vent conduit means 43.

A carrier gas such as helium is passed via conduit means 23 through a heat exchange means 24 wherein said carrier gas is heated to 122° F. and through a conventional valve means 26 to valve means 22. The carrier gas pressure within conduit 23 is regulated by a conventional pressure regulator 27. The carrier gas flows through valve means 22 from 5 to 4 and from 4 to conduit means 30.

Valve means 22 can be operated by a timer, not herein illustrated. This timer can provide output signals that operate the valve in sequence so as to change the fluid flow paths through valve 22. The timer can be any type of apparatus known in the art for providing control signals in a desired sequence. One common type of timer which can be employed utilizes a series of cam-operated switches wherein associated cams are rotated by a timing motor.

After the sample mixture has passed through valve 22 and a portion of the sample mixture is within sample loop 35, valve 22 is repositioned so that sample flow is from 1 to 2 and thence to vent conduit 43. Carrier gas flow is from 5 to 6, through sample loop 35 to 3, from 3 to 4, and then to conduit 30. Thus the carrier gas flowing to a six port valve 25 contains a measured sample portion. The six port valve contains a first port 12, a second port 7, a third port 8, a fourth port 9, a fifth port 10 and a sixth port 11.

Valve 25 functions similarly to valve 22, the difference between valve 25 and valve 22 being that valve 25 does not contain a sample loop. The carrier gas and sample flows from first port 12 to second port 7 within valve means 25 and from 7 to conduit 31. From conduit 31, the carrier gas and sample mixture is introduced into a chromatographic column 33 filled with a material which selectively retards the passage therethrough of the constituents of the fluid mixture to be analyzed. A suitable packing material for the analysis of isobutylene in the presence of butene-1 is a packing material comprising 7.5 weight percent of a partitioning liquid. The partitioning liquid comprises a phenylacetonitrile saturated with silver nitrate crystals and supported on an inert support material such as Chromosorb. The volume of vaporous sample passed to chromatographic column 33, as determined by the volume of sample loop 35, is 200 microliters. The rate of flow of helium is 50 cc. per minute, with the helium passed to valve means 22 at a pressure of 55 p.s.i.g. Chromatographic column 33 is positioned within refrigeration zone 32 and maintained at a refrigerated temperature of 40° F.

An effluent is withdrawn from chromatographic column 33 via conduit means 34 and passed to valve means 25. The effluent mixture is passed through valve means 25 from sixth port 11 to fifth port 10 and from valve means 25 via conduit means 36 to a conventional detector 37.

Detectors 37 and 41 are disposed in respective conduits 36 and 40. These detectors are adapted to measure a property of the fluid sample mixture directed thereto, which property is representative of the composition of the fluid mixture. The detectors can be thermal conductivity cells which include temperature sensitive resistance elements disposed in the path of fluid flow. A reference element, not shown, can be disposed in the carrier gas flow. The temperature differences between the resistance elements can be measured by electrical bridge circuits, such as a Wheatstone bridge, and provide responsive to the temperature differences signals representative of the difference in thermal conductivity in the column effluent and the carrier gas. However, the detectors can also be any other type of apparatus known in the art for measuring a property of a gaseous stream.

Referring to FIGURE 2a, after that portion of the sample mixture represented by peaks 1 and 2 of FIGURE 2a has passed from valve 25 as determined by detector 37, a signal is transmitted to a means not herein illustrated of repositioning valve 25 so as to retain peak 3 within chromatographic column 33. Upon repositioning valve 25, the carrier gas flows from valve 22 via conduit means 30 to valve means 25 and within valve means 25 from first port 12 to 11 and to sixth port conduit 34. By reversing the flow through conduit 34, chromatographic columns 33 is backflushed so as to remove the butene-1 and high boiling butene-2 represented by peak 3 of FIGURE 2a from chromatographic column 33. The backflushed effluent is removed from chromatographic column 33 via conduit means 31 and is passed to valve means 25 and from second port 7 to third port 8 within valve means 25. The backflushed effluent is removed from valve means 25 via conduit means 44 and is vented through a flow restriction means 46.

That portion of the sample mixture represented by peaks 1 and 2 of FIGURE 2a is passed by means of the carrier gas from detector 37 via conduit means 38 to a chromatographic column 39. Chromatographic column 39 is filled with a material that selectively retards the passage therethrough of the constituents of the fluid mixture to be analyzed. A suitable packing material comprises bis(2-n-butoxyethyl)phthalate supported on Chromosorb, and wherein the concentration by weight of the partitioning liquid is 10 percent. Chromatographic column 39 is positioned within refrigeration zone 32 and is maintained at a temperature of 40° F. Chromatographic column 39 effluent is withdrawn via conduit means 40 and passed to a detector 41. Referring to FIGURE 2b, the results of the chromatographic analysis of detector 41 demonstrating the effectiveness of the invention is therein presented. The chromatographic column effluent is vented via conduit means 42.

By maintaining the temperature of chromatographic columns 33 and 39 at a refrigerated temperature, retention of the sample constituents within each of the said columns is increased and resolution is improved.

By maintaining a restriction means 46 in conduit 44, the repositioning of valve 25 will not result in a sudden pressure change in conduits 36, 40 and the remainder of the chromatographic analysis system. This is evidenced by FIGURE 2b wherein no false pressure-change peaks appears. Thus, column 33 can be backflushed and returned to service without undesirable pressure-change effects making accurate sample analysis difficult.

Various modifications of this invention can be made, or followed, in view of the foregoing disclosure and discussion, without departing from the spirit or scope thereof.

We claim:
A method of analysis which comprises introducing a vaporous mixture containing butene-1 and isobutylene into a first chromatographic zone containing a partitioning liquid consisting of phenylacetonitrile saturated with silver nitrate crystals and supported on an inert support mixture, said partitioning liquid being maintained at a refrigerated temperature, which partitioning liquid selectively retards the passage therethrough of the constituents of said mixture, passing an effluent substantially free of butene-1 from said first chromatographic zone to a detector and therein detecting a peak representative of a component containing isobutylene, passing said effluent free of butene-1 and containing isobutylene to a second chromatographic zone containing a material that selectively retards the passage therethrough of the constituents of said mixture, said material comprising bis(2-n-butoxyethyl)phthalate supported on an inert packing material, backflushing said first chromatographic zone with a gas, said backflushing being responsive to detection of said isobutylene while maintaining the pressure substantially constant in said second chromatographic zone during the operation, and measuring a property of said second effluent from said second chromatographic zone representative of the composition thereof.

References Cited
UNITED STATES PATENTS

| | | | |
|---|---|---|---|
| 2,868,011 | 1/1959 | Coggeshall | 73—23.1 |
| 2,981,092 | 4/1961 | Marks | 73—23.1 |
| 3,030,798 | 4/1962 | Lichtenfels | 72—23.1 |
| 3,056,278 | 10/1962 | Guenther | 73—23.1 |
| 3,112,639 | 12/1963 | Maxwell | 73—23.1 |
| 3,120,749 | 2/1964 | Paglis et al. | 73—23.1 |

OTHER REFERENCES

Neely, E. E.: "Analysis of Chlorine Cell Gas by Gas Chromatography," in Analytical Chemistry, 32 (11): pp. 1328–1383, October 1960, QD 71, I42.

Baker, W. J. et al.: "Multiple Columns in Chromatography," in Control Engineering, 8 (1): pp. 77–81, January 1961, TJ 212 C6.

Ettre, L. S.: "Application of Gas Chromatographic Methods for Air Pollution Studies," in Journal of the Air Pollution Control Association, 11 (1): p. 42, January 1961.

Porter, R. S. et al.: "Low Temperature Gas Chromatography," in Analytical Chemistry, 33 (9): pp. 1152–1153, August 1961, QD 71, I142.

RICHARD C. QUEISSER, *Primary Examiner.*

J. C. GOLDSTEIN, *Assistant Examiner.*